(12) United States Patent  
Smith (10) Patent No.: US 8,919,278 B2
(45) Date of Patent: Dec. 30, 2014

(54) WATERPROOF COATING SYSTEM AND METHOD OF APPLICATION

(75) Inventor: David H. Smith, Nevada City, CA (US)

(73) Assignee: Harco Americas, Inc., Las Vegas, NV (US)

( * ) Notice: Subject to any disclaimer, the term of this patent is extended or adjusted under 35 U.S.C. 154(b) by 279 days.

(21) Appl. No.: 12/728,881

(22) Filed: Mar. 22, 2010

(65) Prior Publication Data

US 2010/0173089 A1  Jul. 8, 2010

Related U.S. Application Data

(63) Continuation of application No. 11/307,551, filed on Feb. 13, 2006.

(51) Int. Cl.
| | |
|---|---|
| *B05B 5/025* | (2006.01) |
| *B05C 5/02* | (2006.01) |
| *B05B 7/06* | (2006.01) |
| *B05C 5/00* | (2006.01) |
| *B05B 7/24* | (2006.01) |
| *B05B 7/08* | (2006.01) |
| *B05B 7/12* | (2006.01) |
| *C08L 95/00* | (2006.01) |
| *E04D 7/00* | (2006.01) |
| *E04D 15/00* | (2006.01) |
| *C08L 11/02* | (2006.01) |

(52) U.S. Cl.
CPC .................. *B05B 7/24* (2013.01); *B05B 7/0846* (2013.01); *B05B 7/1209* (2013.01); *C08L 95/005* (2013.01); *E04D 7/00* (2013.01); *E04D 15/00* (2013.01); *B05B 7/1263* (2013.01); *B05B 7/2497* (2013.01); *C08L 11/02* (2013.01)
USPC ............ 118/627; 118/600; 118/316; 118/313

(58) Field of Classification Search
USPC ........................................................ 118/627
See application file for complete search history.

(56) References Cited

U.S. PATENT DOCUMENTS

| | | | |
|---|---|---|---|
| 1,782,186 A | 11/1930 | Abson | |
| 3,236,671 A | 2/1966 | Dybalski et al. | |
| 3,837,575 A * | 9/1974 | Lehnert | 239/112 |
| 4,005,824 A * | 2/1977 | Becker et al. | 239/289 |
| 4,156,041 A * | 5/1979 | Gilbert | 427/244 |
| 4,296,207 A | 10/1981 | Siegmund | |
| 4,928,627 A * | 5/1990 | Lindner | 118/718 |
| 5,085,896 A | 2/1992 | Marks et al. | |
| 5,219,914 A | 6/1993 | Warburton, Jr. | |
| 5,234,988 A | 8/1993 | Brooks et al. | |
| 5,403,393 A | 4/1995 | Dubble | |
| 5,763,014 A | 6/1998 | Pickett | |

(Continued)

*Primary Examiner* — Shuangyi Abu Ali
(74) *Attorney, Agent, or Firm* — Temmerman Law Office; Matthew J. Temmerman (57) ABSTRACT

A coating comprises a resin solution including a solution of neoprene latex and liquid asphalt emulsion and an accelerator solution including an aqueous solution of zinc sulfate powder and water. A spray system for applying the coating includes a spray gun having first and second nozzles, a first pump fluidly connected between the first nozzle and a resin solution reservoir for delivering the resin solution to the first nozzle at a first fluid pressure, and a second pump fluidly connected between the second nozzle and an accelerator solution reservoir for delivering the accelerator solution to the second nozzle at a second fluid pressure different from the first pressure. The accelerator solution may be aerated by a source of compressed air prior to discharge from the second nozzle.

12 Claims, 7 Drawing Sheets

(56) References Cited

U.S. PATENT DOCUMENTS

| | | |
|---|---|---|
| 5,897,061 A | 4/1999 | Petty |
| 5,900,061 A * | 5/1999 | Wright .................. 118/300 |
| 5,985,366 A | 11/1999 | Wright |
| 6,060,555 A | 5/2000 | Wright |
| 6,855,754 B2 | 2/2005 | Takamura et al. |
| 6,942,735 B2 | 9/2005 | Rich |
| 2006/0130704 A1 | 6/2006 | Partanen |
| 2008/0028978 A1 | 2/2008 | Twining et al. |

* cited by examiner

WATERPROOF COATING SYSTEM AND METHOD OF APPLICATION

DOMESTIC PRIORITY INFORMATION

This application is a Continuation Application of U.S. patent application Ser. No. 11/307,551, filed Feb. 13, 2006

BACKGROUND OF INVENTION

This invention relates generally to waterproof coating systems, and more particularly to a two-part water-based coating and method for applying the coating to a surface so that the coating is substantially immediately cured upon application to the surface.

Exterior coatings are exposed to the vicissitudes of weather from the very moment they are applied to protect an exterior surface. Water-based coatings are favored over solvent borne coatings for a number of well known reasons. They offer ease of application, reduced toxic solvent emission, lower raw material and application costs, and easy cleanup of site and equipment. However, water-based coatings are particularly vulnerable to water damage during and immediately after application. A sudden summer shower can wash away or otherwise damage the result of many hours of labor and waste valuable materials.

Exterior water-based coatings may be formulated using aqueous dispersions of water-insoluble polymer latex as binders. After application, the aqueous carrier evaporates, and the individual latex particles coalesce to form an integral film. Some applications require relatively thick coating films, conventionally on the order of 20-40 mils (0.05-0.10 cm) or more. These coatings are often applied by spraying techniques with mixed results. Because they are applied as a thick coating, they lose water by evaporation relatively slowly in comparison with other polymer latex coating products such as house paints which are typically applied at 5-8 mils (0.013-0.02 cm). Thus, roof coatings are particularly vulnerable to being washed off by unanticipated precipitation. In order to avoid roof coating washout or damage due to water, it is typically necessary to apply the full thickness in two or more separate applications which effectively increases labor costs.

The application of such coatings also require the laborer to haul heavy equipment and materials to the surface to be coated. This is especially inconvenient and time consuming when the coating is to be applied to a roof top. Since some coating systems require components with high viscosity and large particle sizes, it would be very difficult to pump such liquids and particles to the roof top from a lower level or over long lengths of tubing or hose.

Many roof membranes also require joint details or laps and mechanical or chemical fastening techniques which can eventually lead to membrane failure. In addition, commercial, industrial and home roof structures typically include many penetrations for vent stacks, mounting hardware for antennas or other equipment, and structures, with each penetration being a potential leak sight.

It would therefore be desirable to provide a coating system and method of application that overcomes at least some of the disadvantages of the prior art.

BRIEF SUMMARY OF THE INVENTION

According to one aspect of the invention, a coating comprises a resin solution including a solution of neoprene latex and liquid asphalt emulsion and an accelerator solution including an aqueous solution of zinc sulfate powder and water.

According to a further aspect of the invention, a spraying system for applying a coating to a surface includes a spray gun having first and second nozzles, a first pump fluidly connected between the first nozzle and a resin solution reservoir for delivering the resin solution to the first nozzle at a first fluid pressure, and a second pump fluidly connected between the second nozzle and an accelerator solution reservoir for delivering the accelerator solution to the second nozzle at a second fluid pressure different from the first pressure.

According to yet a further aspect of the invention, a method for applying a coating includes providing a spray gun with first and second nozzles; discharging a resin solution from the first nozzle at a first fluid pressure; discharging an accelerator solution from the second nozzle at a second fluid pressure; combining the discharged resin solution with the discharged accelerator solution before application to the surface; and substantially curing the combined resin and accelerator solutions before application to the surface.

BRIEF DESCRIPTION OF THE DRAWINGS

The foregoing summary as well as the following detailed description of the preferred embodiments of the present invention will be best understood when considered in conjunction with the accompanying drawings, wherein like designations denote like elements throughout the drawings, and wherein.

It is noted that the drawings are intended to depict typical embodiments of the invention and therefore should not be considered as limiting the scope thereof. It is further noted that the drawings are not necessarily to scale. The invention will now be described in greater detail with reference to the accompanying drawings.

DETAILED DESCRIPTION OF THE INVENTION

Figure 1:
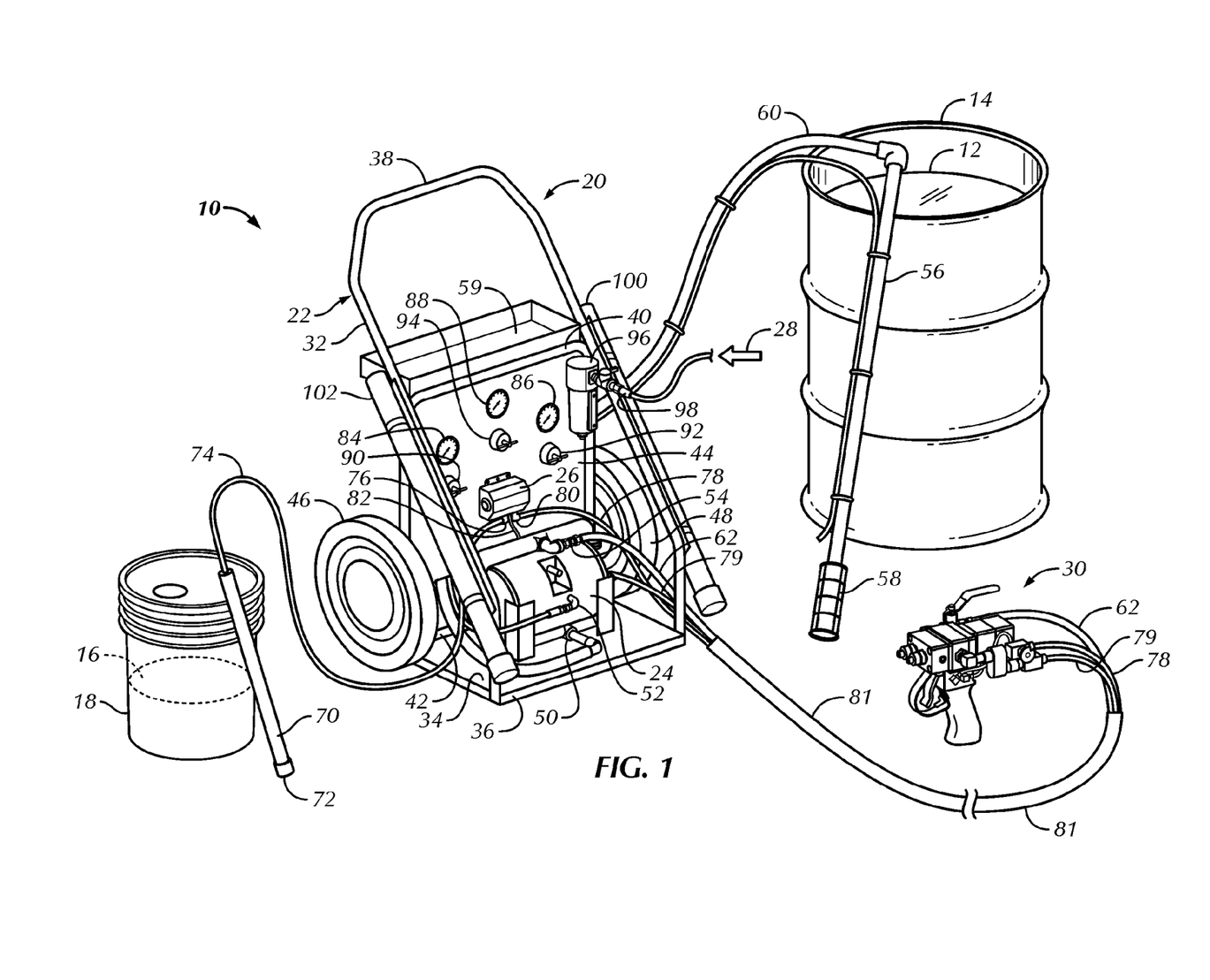
FIG. 1 is a perspective view of a coating system according to the present invention.
Figure 2:
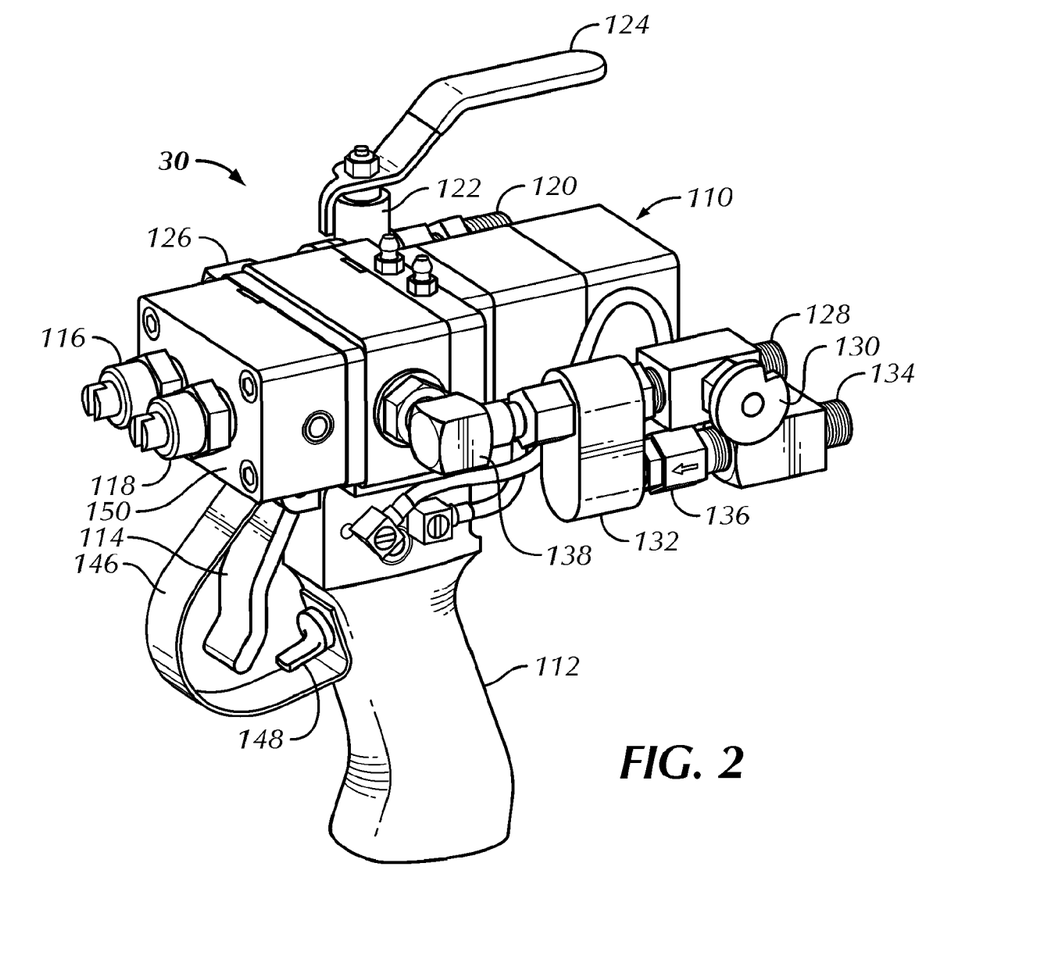
FIG. 2 is a side perspective view of a hand-held applicator spray gun that forms part of the coating system of FIG. 1.
Figure 3:
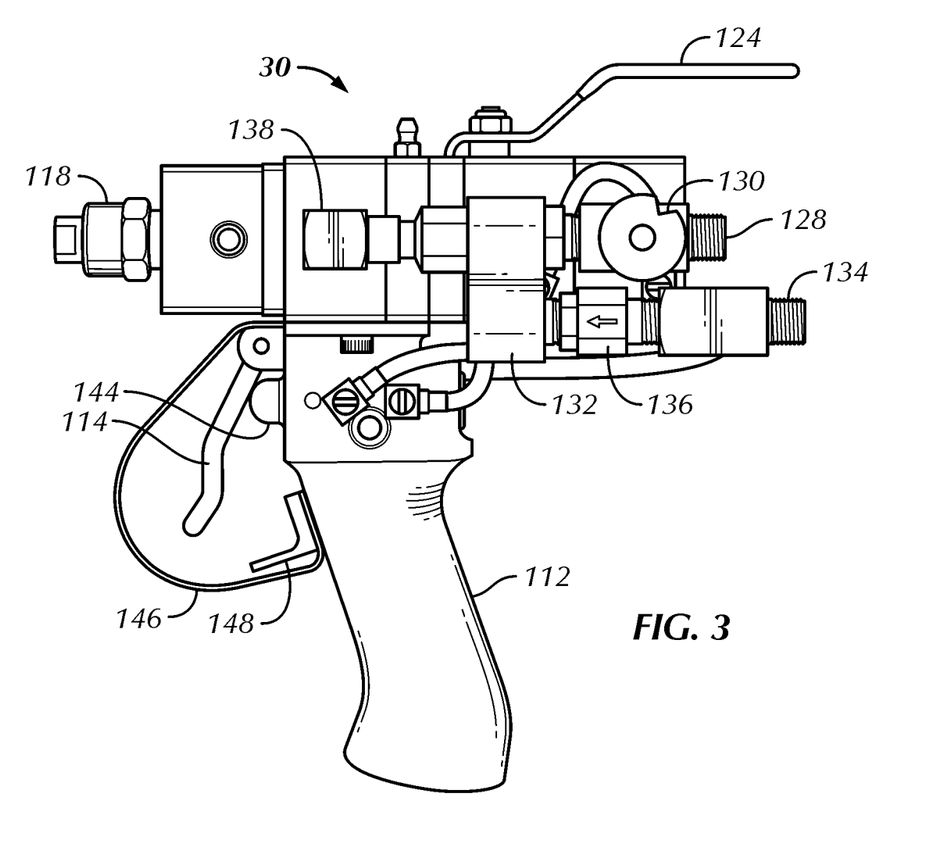
FIG. 3 is a left side elevational view of the spray gun of FIG. 2.
Figure 4:
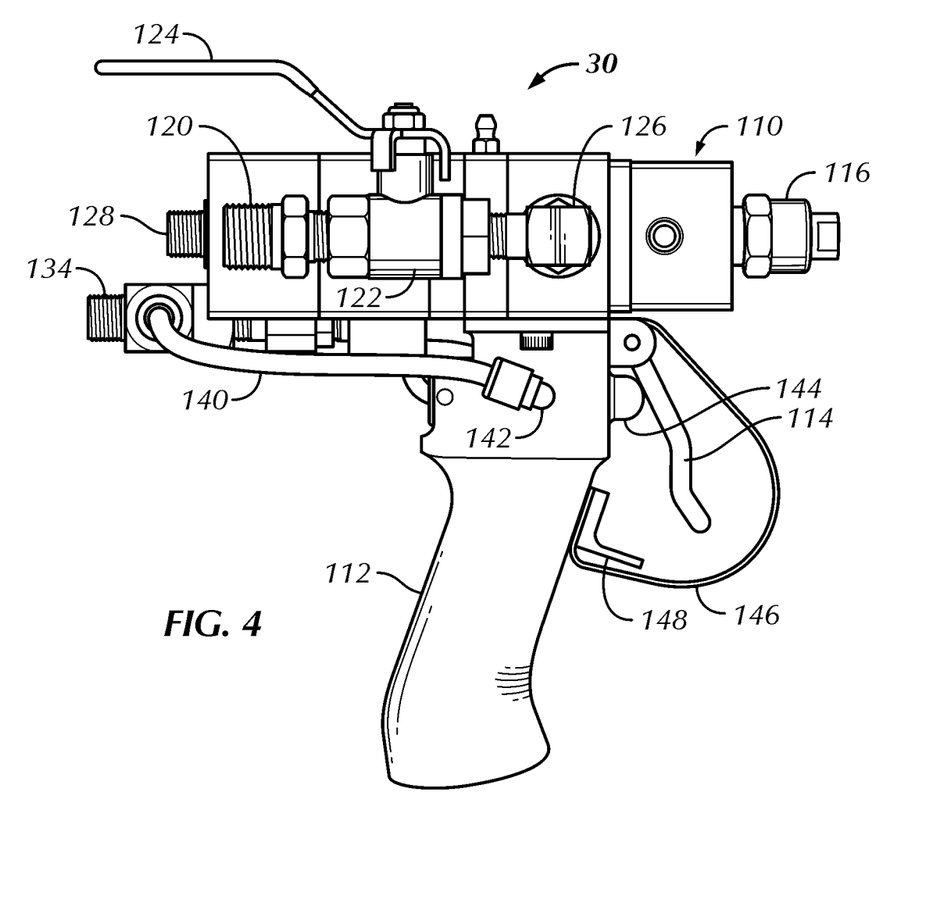
FIG. 4 is a right side elevational view of the spray gun.

Referring to the drawings, and to FIG. 1 in particular, a coating system 10 in accordance with the present invention is illustrated. The coating system 10 preferably includes a coating comprising a resin solution 12 contained within a barrel 14 and an accelerator solution 16 (shown in hidden line) contained within a bucket 18, and a coating delivery system 20 for combining the resin and accelerator solutions and applying them to a surface to be coated, as will be described in greater detail below. It will be understood that the particular containers shown are exemplary only and that the resin solution 12 and accelerator solution 16 may be stored in any type of container.

The resin solution 12 preferably includes a water-based liquid neoprene latex, such as polychloroprene, combined with a water-based liquid asphalt emulsion. Preferably, the neoprene latex contains approximately 59% solids and has a high pH value of about 12.0. It has been found that an asphalt grade of SS 1 h works particularly well since it is tackier and dries faster than other grades of asphalt. The optimal weight ratio of liquid latex to asphalt emulsion is approximately 1:1 (50% of each product), which results in optimal adhesive strength and elongation of the cured coating than other ratios. However, the particular latex to asphalt ratio may vary over a broad range depending on the particular properties desired. For example, an increase in the amount of latex would result in a higher cost coating with higher tensile strength and less adhesive strength. In some instances, it may be desirable to eliminate either the liquid neoprene latex or the asphalt emulsion. Accordingly, the liquid latex and asphalt emulsion of the resin solution 12 may proportionately range from 0% to 100%. At the optimal weight ratio of 1:1, a low viscosity resin solution of about 30 to 50 centipoises is obtained, which greatly facilitates delivery of the resin solution over long lengths of supply tubing.

The accelerator solution 16 preferably includes an aqueous solution of zinc sulfate powder dissolved in water. For optimum performance and coagulation of the resin solution 12, eight pounds of zinc sulfate is preferably added to five gallons of water to produce a low pH level of about 4.5. Since a gallon of water weighs about 8.35 pounds, an optimum weight ratio of zinc sulfate to water is about 1:5. However, it will be understood that the particular zinc sulfate to water ratio may vary over a broad range depending on the particular properties and performance desired. The zinc sulfate powder is preferred not only because of its ability to quickly coagulate the resin solution 12, but also because it has been found to be less irritating to persons applying the coating to a surface than other coagulating materials. However, it will be understood that other materials may be used in place of zinc sulfate, such as citric acid or any other material that will cause coagulation of the resin solution 12. As with the resin solution 12, the accelerator solution 16 is also preferably of low viscosity.

During application of the coating to a surface, the delivery system 20 preferably combines the resin solution 12 and the accelerator solution 16 during spraying such that the resin to accelerator spray ratio is in the range of about 15:1 to 1:0, and more preferably in the range of 15:1 to 10:1. A greater amount of accelerator results in a shorter curing time, while a lesser amount results in a longer curing time. In the case of a 1:0 ratio, no accelerator is used. On some nonporous surfaces, or in high humidity and/or low temperature ambient conditions, it may be desirable to apply a tacky primer coating of resin solution only (1:0 ratio) before a coating of the combined resin and accelerator solutions to ensure superior adhesion to such surfaces and/or in such ambient conditions. Accordingly, the coating delivery system 20 of the present invention permits adjustment of the spray ratio of resin to accelerator over a wide range of values.

As shown in FIG. 1, the coating delivery system 20 includes a cart 22 with an air-operated resin pump 24 and an air-operated accelerator pump 26, a compressed air supply as represented by arrow 28, and an airless spray gun 30 fluidly connected to the pumps 24, 26 and air supply 28. Although the resin and accelerator pumps are preferably air-operated, it will be understood that the pumps may alternatively be electrically powered. The compressed air supply may be in the form of an air compressor, pressurized air tank, or a combination thereof. Preferably, to meet optimal coating requirements, a suitable compressed air supply delivers approximately 20 cubic feet per minute at 100 psi.

The cart 22 preferably has a first U-shaped frame 32 that extends generally upwardly and rearwardly from a forward end 36 of a horizontal platform 34 to form a handle 38, a second U-shaped frame 40 that extends generally vertically between a rear end 42 of the platform 34 and the first U-shaped frame 32, a support panel 44 that is mounted to the second frame 40, and a pair of wheels 46, 48 rotatably connected to the platform 34 for transporting the cart 22. A tool tray 59 is mounted to the cart 22 above the support panel 44.

The resin pump 24 is preferably securely supported on the platform 34 and includes a first fluid input port 50 for receiving the resin solution 12 from the container 14, a second fluid input port 52 for receiving air under pressure from the compressed air source 28, and a fluid output port 54 for delivering the resin solution 12 under pressure to the spray gun 30. A relatively stiff suction conduit 56 is adapted for insertion into the resin solution 12 located in the container 14. A filter element 58 is connected to a lower end of the suction conduit 56 to filter out foreign matter that may be present in the resin solution during resin pump operation. A flexible suction tube 60 extends between the suction conduit 56 and the first fluid input port 50 for drawing the resin solution 12 under vacuum from the container 14 to the resin pump 24. A flexible resin delivery tube 62 extends between the fluid output port 54 and the spray gun 30 for delivering the pressurized resin solution to the spray gun 30. Preferably, the resin pump is a stainless steel diaphragm pump that operates when compressed air is applied to the second fluid port 52 to suction resin solution from the container 14 and deliver the resin solution under pressure to the spray gun 30. However, it will be understood that other types of pumps can be used. Preferably, the ratio of applied compressed air pressure to the supplied resin solution pressure is 1:3, such that an applied air pressure of approximately 100 psi to the second fluid port 52 results in a supplied resin solution pressure of about 300 psi to the spray gun 30.

The accelerator pump 26 is preferably securely supported on the support panel 44 above the resin pump 24. A relatively stiff suction conduit 70 is adapted for insertion into the accelerator solution 16 located in the container 18. A filter element 72 is connected to a lower end of the suction conduit 70 to filter out foreign matter that may be present in the accelerator solution during accelerator pump operation. A flexible suction tube 74 extends between the suction conduit 70 and a first fluid input port 76 for drawing the accelerator solution 16 under vacuum from the container 18 to the accelerator pump 26. A flexible accelerator delivery tube 78 extends between a fluid output port 80 of the accelerator pump 26 and the spray gun 30 for delivering the pressurized accelerator solution to the spray gun 30. Preferably, the accelerator pump operates when compressed air is applied to an air inlet port 82 to suction accelerator solution from the container 18 and deliver the accelerator solution under pressure to the spray gun 30. Preferably, the accelerator solution is pressurized at about 60 psi to the spray gun 30.

An air delivery tube 79 is fluidly connected between the spray gun 30 and the compressed air supply 28 to provide pressurized air to the spray gun 30 for both controlling operation of the spray gun and controlling the amount of atomization of the accelerator solution 16, as will be described in greater detail below. The delivery tubes 62, 78 and 79 may be contained within a flexible sleeve 81 for protection during storage, transportation and use.

The support panel 44 also includes gauges 84, 86 and 88 and adjustable pressure regulators 90, 92 and 94 for selectively monitoring and adjusting the delivery air pressure to the resin pump 24, accelerator pump 26, and the spray gun 30, respectively. Accordingly, the precise delivery pressure of the resin solution 12, the accelerator solution 16, and the atomizing and operating air to the spray gun 30 can be controlled with a high degree of accuracy. An oil and water filter 96 is mounted to the support panel 44 and includes an input port 98 for receiving air under pressure from the compressed air source 28. An output (not shown) of the filter 96 is in turn fluidly connected to the resin pump 24, accelerator pump 26 and spray gun 30 through the pressure regulators 90, 92 and 94, respectively.

Holsters in the form of hollow storage cylinders 100 and 102 are connected to opposite sides of the first U-shaped frame 32 for receiving the suction conduits 56 and 70, respectively, during transportation and storage. Cleaning fluid may be located in each holster for soaking the conduits and their respective filters during non-use.

With additional reference to FIGS. 2-7, the airless spray gun 30 includes a body 110 with a handle 112 extending downwardly from the body, an air-actuated trigger 114 positioned forwardly of the handle, and nozzles 116, 118 for delivering the resin solution 12 and accelerator solution 16, respectively, to a surface to be coated. A resin hose coupling 120 is arranged for connection to the flexible resin delivery tube 62 (FIG. 1). A valve 122 is in turn connected to the coupling 120. The valve 122 includes a handle 124 for adjusting the flow of resin solution 12 between a fully closed and fully open position. The valve 122 is in turn connected to a resin inlet 126 of the spray gun 30, which is in fluid communication with the nozzle 116.

An accelerator hose coupling 128 is arranged for connection to the flexible accelerator delivery tube 78 (FIG. 1). An adjustable valve 130 is connected to the coupling 128 and an integrator valve assembly 132 is in turn connected to the valve 130. The valve 130 can be adjusted for altering the volume of accelerator solution 16 delivered to the integrator valve assembly 130. By controlling delivery of the resin solution, accelerator solution and air pressure, the amount of atomization and pressure can be precisely controlled to achieve the desired coating effects.

An air hose coupling 134 is arranged for connection to the air delivery tube 79 (FIG. 1). A one-way check valve 136 is in turn connected between the coupling 134 and integrator valve assembly 132. The integrator valve assembly 132 mixes the air under pressure with the accelerator solution at a predetermined ratio so that the accelerator solution is properly atomized as it exits the valve 118 via the accelerator inlet 138 which is connected to the valve assembly 132.

When the trigger 114 is depressed, a double-acting valve 144 (FIG. 3) is actuated to release the resin solution and the accelerator lair solution under pressure through the nozzles 116 and 118, respectively. In order to prevent user fatigue during coating operations, the trigger 114 is preferably air-actuated. To that effect, an air line 140 (FIG. 4) extends between the air hose coupling 134 and a trigger inlet port 142. When the trigger 114 is depressed, air under pressure is applied against the double-acting valve 144 to hold the valve open. In this manner, only light finger pressure is required to pull the trigger 114 and hold it in the open (spraying) position. A trigger guard 146 is attached to the handle 112 and extends around the trigger 114. A safety latch 148 is positioned on the handle 112 in proximity to the trigger guard 146 and is movable to a position to lock the trigger in the closed (inactive) position.

The relatively low pressure supply of the resin solution 12 and accelerator solution 16 to the airless spray gun 30 offers great advantages over prior art systems where pressures can easily range from about 1800 psi to about 2500 psi, requiring special safety equipment to avoid accidental injection of fluid into the operator. With the low pressure system of the present invention, the chance of injury through fluid injection from the spray nozzles is substantially reduced or eliminated.

Figure 5:
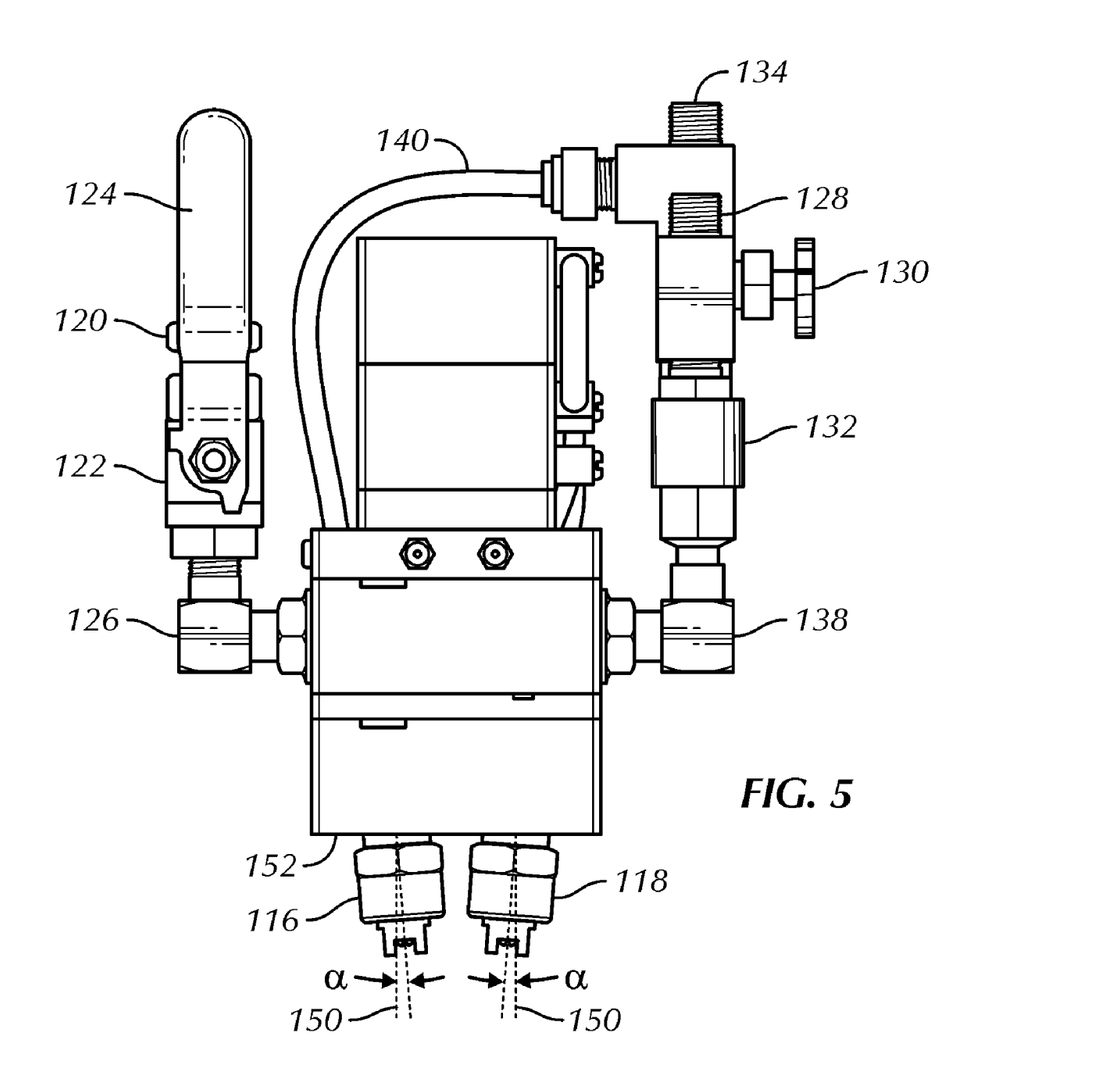
FIG. 5 is a top plan view of the spray gun.
Figure 6:
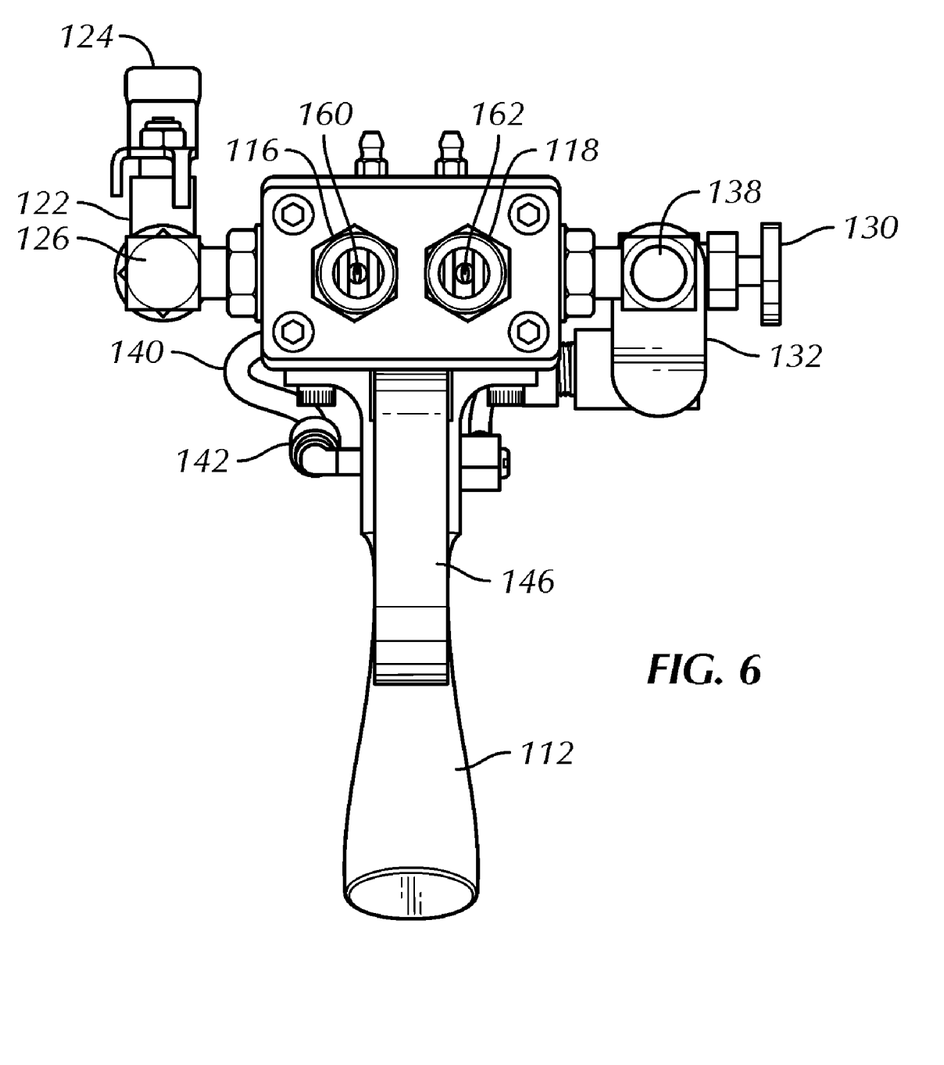
FIG. 6 is a front elevational view of the spray gun.
Figure 7:
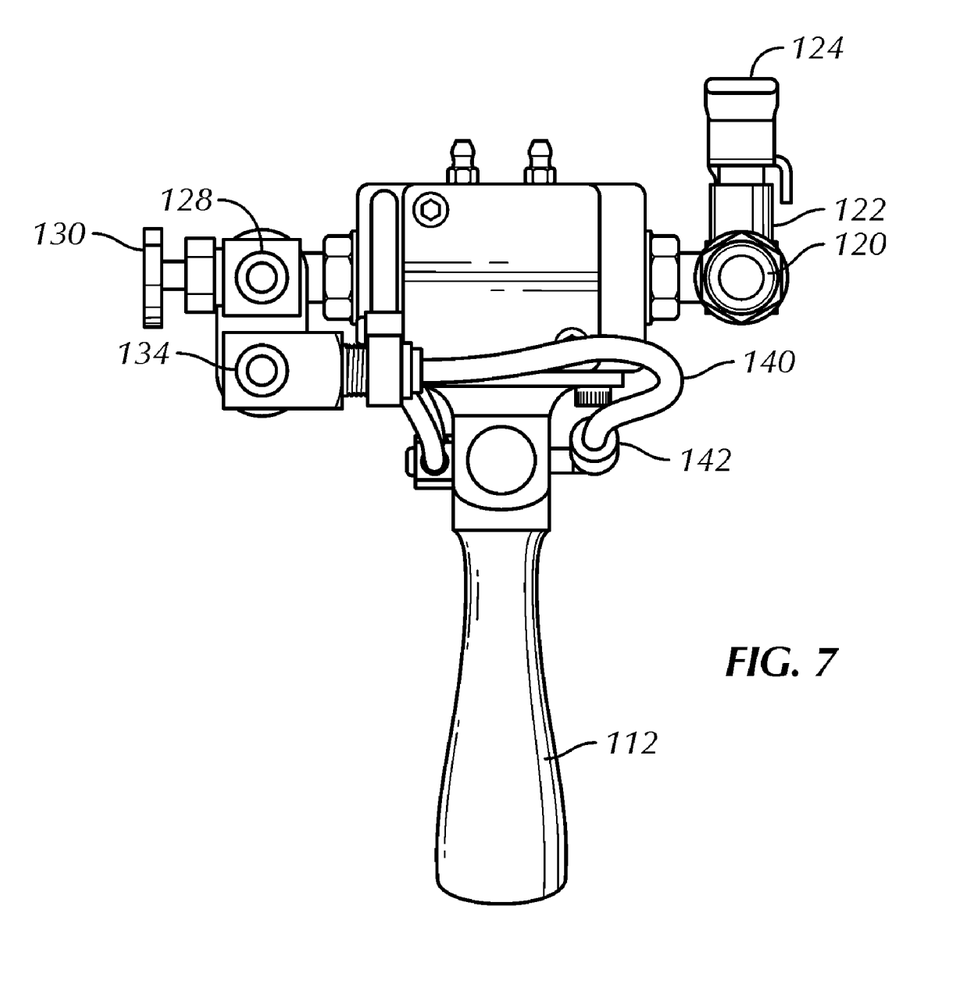
FIG. 7 is a rear elevational view of the spray gun.

With particular reference to FIGS. 5 and 6, each nozzle 116, 118 is oriented at an angle ex with respect to a line 150 perpendicular to a front face 152 of the spray gun 30. Preferably, the angle ex is approximately 4.4 degrees so that the atomized resin solution 12 and atomized accelerator solution 16 are combined at approximately four inches from the nozzles 116, 118. It will be understood that one or both of the nozzles may have other angular orientations so that the solutions 12, 16 are combined at other distances from the nozzles. The nozzle 116 preferably has an aperture 160 with a predefined diameter and fan angle. Likewise, the nozzle 118 preferably has an aperture 162 with a predefined diameter and fan angle. The following chart illustrates preferred aperture sizes, fan angles and pressure settings for optimal performance during a standard coating application:

| | |
|---|---|
| Resin Nozzle Size | 0.072 inch diameter × 40 degree spray angle |
| Resin Air Pressure/Liquid Pressure | 100 PSI/300 PSI |
| Air Atomization Pressure | 30 PSI |
| Accelerator Nozzle Size | 0.061 inch diameter × 60 degree spray angle |
| Accelerator Pressure | 60 PSI |

The following chart illustrates preferred aperture sizes, fan angles and pressure settings for optimal performance during a high production coating application:

| | |
|---|---|
| Resin Nozzle Size | 0.078 inch diameter × 50 degree spray angle |
| Resin Air Pressure/Liquid Pressure | 100 PSI/300 PSI |
| Air Atomization Pressure | 50 PSI |
| Accelerator Nozzle Size | 0.075 inch diameter × 65 degree spray angle |
| Accelerator Pressure | 70 PSI |

As will be noted, the spray angle for the accelerator nozzle is greater than the spray angle for the resin nozzle so that optimal convergence can occur between the two spray streams at the different delivery pressures. It will be understood that the particular pressures, aperture sizes and spray angles are given by way of example only and can greatly vary.

During the coating operation, the resin solution and accelerator solution are atomized at the airless spray nozzles 116, 118 under relatively low pressure when compared to prior art systems and, as before described, combine a predetermined distance from the spray nozzles. Preferably, both solutions are atomized through the airless spray nozzles at a flow rate of about 2 to 5 gallons per minute (gpm). As the atomized solutions combine, a rapid cure of the resin solution is created by the intimate mixture of the high pH resin solution and low pH accelerator solution. With the preferred settings, configurations and combinations of materials as described above, it has been found that approximately 80% of the coating is cured in about a three-second time period. The chemical reaction commenced during spraying continues at the surface where shrinkage of the coating thickness occurs. Consequently, the accelerator is squeezed out of the membrane and accumulates on the sprayed surface in the form of water droplets which can be either rinsed off with water, force dried, or left to evaporate. As the accelerator is squeezed out of the membrane, the coating will have increasingly greater adhesion strength to the undersurface until it is completely adhered at full cure. With the present invention, a coating thickness in the range of 60 mils or less to one-fourth inch or more is possible with a single pass. If greater thickness is desired, multiple passes may be used after the previous pass has cured. This is a great advantage over prior art systems and coatings since multiple passes and long cure times are typically required to achieve less than 60 mils thickness. It will be understood that the amount of coating that is substantially immediately cured can greatly vary from 80% depending on the particular formulation of the resin and acceleration solutions as well as the system settings.

The low viscosity liquid resin solution and low viscosity liquid accelerator solution enable the delivery system 20 to have a longer delivery tube or hose length, typically on the order of 250 feet or more depending on pressure settings and so on, so that equipment and materials can be located on a lower level or at a remote location from the surfaces to be coated to thereby avoid the difficulty and labor of transporting materials and moving them around at the coating sight.

The coating of the present invention is especially advantageous since it is forms a seamless, monolithic membrane that is immediately waterproof when applied to the surface, even before full cure. Accordingly, the coating is invulnerable to washout or damage by unanticipated precipitation as it protects the surface underneath from moisture. The time to full cure may vary depending on humidity, temperature, wind condition, film thickness, and substrate type, but is typically within 4 to 48 hours after application for the preferred formulations and settings as described above. The coating may also be applied to damp surfaces without adverse results, thereby saving considerable time and labor costs over prior art systems that require a completely dry surface.

The coating of the present invention is particularly well suited to application over existing or new residential and commercial roof structures and materials. The lightweight nature of the coating, which is typically about 4 ounces per square foot for a 60 mils cured coating, permits its application over existing roof structures without expensive tear-out of previous or damaged roof materials. In one application, the coating of the present invention may be used to directly replace the typical tar paper underlayment on many roof structures. It can be used to create an impenetrable membrane and flashing system that eliminates the problems associated with paper buckling as well as improperly applied ice and water shields at approximately the same installation costs. In addition, application of the coating around vent stacks and other roof protrusions or openings to provide a water proof seal is greatly facilitated by the system and coating of the present invention.

The system of the present invention may also be used to coat vertical and overhead surfaces since the coating will not run or sag. One especially suited application includes foundation waterproofing. With the ability to stretch up to 1500%, the coating will keep foundation cracks sealed. It can also be extended above grade to thereby seal the foundation against both below grade and above grade water intrusion.

It will be understood that the term "preferably" as used throughout the specification refers to one or more exemplary embodiments of the invention and therefore is not to be interpreted in any limiting sense. In addition, terms of orientation and/or position as may be used throughout the specification, such as upwardly, rearwardly, horizontal, vertically, as well as their respective derivatives and equivalent terms denote relative, rather than absolute orientations and/or positions.

It will be appreciated by those skilled in the art that other coating applications and advantages are made possible by the coating system and method of the present invention. It will be understood that changes could be made to the embodiments described above without departing from the broad inventive concept thereof. Accordingly, this invention is not limited to the particular embodiments disclosed, but also covers modifications within the spirit and scope of the present invention as defined by the appended claims.

I claim:
1. A spraying system comprising a mixed coating, the mixed coating having a resin solution and an accelerator solution, the system further comprising:
   a. a spray gun comprising a first and a second nozzle;
   b. a first pump fluidly connected between the first nozzle and a resin solution reservoir;
   c. a first delivery tube fluidly connected between the first pump and the first nozzle, the first delivery tube comprising resin solution at a first fluid pressure of below 400 psi;
   d. a second pump fluidly connected between the second nozzle and an accelerator solution;
   e. a second delivery tube fluidly connected between the second pump and the second nozzle, the second delivery tube comprising accelerator solution at a second fluid pressure;
   f. an adjustable valve coupled to an integrator valve assembly and operable to control the flow of accelerator solution;
   g. a double-acting valve fluidly connected between said first nozzle and said resin solution reservoir and between said second nozzle and said accelerator solution reservoir;
   h. an adjustable valve operable to control the flow of the resin solution into the spray Run; and
   i. a trigger operatively connected to said double-acting valve and comprising a safety latch movable to a position to lock the said trigger in closed position; wherein said resin solution comprises a solution of neoprene latex and liquid asphalt emulsion and wherein said accelerator solution includes one of:
   a. an aqueous solution of zinc sulfate and water; and
   b. citric acid.

2. A spraying system according to claim 1, wherein the first fluid pressure is greater than the second fluid pressure.

3. A spraying system according to claim 1, wherein the spray gun further includes an integrator valve assembly fluidly connected to the second nozzle and a compressed air source for combining the accelerator solution with compressed air before discharging the accelerator solution out of the second nozzle.

4. A spraying system according to claim 2, wherein the first and second pumps are powered by the compressed air source.

5. A spraying system according to claim 1, wherein at least one of the nozzles is angled toward the other nozzle so that the resin solution and accelerator solution are atomized and combined at a predetermined distance from the nozzles upon discharge therefrom.

6. A spraying system according to claim 3, wherein the first and second nozzles are angled toward each other.

7. A spraying system according to claim 1, wherein at least one of the nozzles is angled toward the other nozzle so that the resin solution and accelerator solution are combined at a predetermined distance from the nozzles upon discharge therefrom.

8. A spraying system according to claim 1, wherein the resin solution has a high pH value and the accelerator solution has a low pH value so that the resin solution immediately coagulates when combined with the accelerator solution.

9. A spraying system according to claim 1 wherein the weight ratio of liquid latex to asphalt emulsion is 1:1.

10. A spraying system according to claim 9 wherein the viscosity of the resin solution is in the range of about 30 to 50 centipoises.

11. A spraying system according to claim 1 wherein the resin solution has a high pH value and the accelerator solution has a low pH value so that the resin solution immediately coagulates when combined with the accelerator solution.

12. A spraying system according to claim 2 wherein the weight ratio of liquid latex to asphalt emulsion is 1:1.

* * * * *

UNITED STATES PATENT AND TRADEMARK OFFICE
CERTIFICATE OF CORRECTION

PATENT NO. : 8,919,278 B2
APPLICATION NO. : 12/728881
DATED : December 30, 2014
INVENTOR(S) : Smith It is certified that error appears in the above-identified patent and that said Letters Patent is hereby corrected as shown below:

Column 8, lines 2-34, Claim 1 should read as follows:

1. A spraying system comprising a mixed coating, the mixed coating having a resin solution and an accelerator solution, the system further comprising:
    a. a spray gun comprising a first and a second nozzles;
    b. a first pump fluidly connected between the first nozzle and a resin solution reservoir;
    c. a first delivery tube fluidly connected between the first pump and the first nozzle, the first delivery tube comprising resin solution at a first fluid pressure of below 400 psi;
    d. a second pump fluidly connected between the second nozzle and an accelerator solution reservoir;
    e. a second delivery tube fluidly connected between the second pump and the second nozzle, the second delivery tube comprising accelerator solution at a second fluid pressure;
    f. an adjustable valve coupled to an integrator valve assembly and operable to control the flow of accelerator solution;
    g. a double-acting valve fluidly connected between said first nozzle and said resin solution reservoir and between said second nozzle and said accelerator solution reservoir;
    h. an adjustable valve operable to control the flow of the resin solution into the spray gun; and Signed and Sealed this
Twenty-ninth Day of March, 2016

Michelle K. Lee
*Director of the United States Patent and Trademark Office* i. a trigger operatively connected to said double-acting valve and comprising a safety latch movable to a position to lock the said trigger in closed position; wherein said resin solution comprises a solution of neoprene latex and liquid asphalt emulsion and wherein said accelerator solution includes one of:

a. an aqueous solution of zinc sulfate and water; and b. citric acid.